United States Patent
Castagnini et al.

(10) Patent No.: US 10,574,174 B2
(45) Date of Patent: Feb. 25, 2020

(54) ELECTRICAL MACHINE AND METHOD FOR OPERATING AN ELECTRICAL MACHINE

(71) Applicant: ABB Schweiz AG, Baden (CH)

(72) Inventors: Alessandro Castagnini, Novara (IT); Darren Tremelling, Apex, NC (US); Elio Alberto Perigo, Raleigh, NC (US); Giulio Secondo, Genoa (IT); Liming Liu, Cary, NC (US)

(73) Assignee: ABB Schweiz AG, Baden (CH)

( * ) Notice: Subject to any disclaimer, the term of this patent is extended or adjusted under 35 U.S.C. 154(b) by 231 days.

(21) Appl. No.: 15/859,463

(22) Filed: Dec. 30, 2017

(65) Prior Publication Data

US 2019/0207550 A1    Jul. 4, 2019

(51) Int. Cl.
*H02P 31/00* (2006.01)
*H01F 13/00* (2006.01)
*H02K 15/03* (2006.01)
*H02K 1/27* (2006.01)
*H02K 1/20* (2006.01)

(52) U.S. Cl.
CPC ........... *H02P 31/00* (2013.01); *H01F 13/003* (2013.01); *H02K 1/2766* (2013.01); *H02K 15/03* (2013.01); *H02K 1/20* (2013.01)

(58) Field of Classification Search
CPC ......... H02P 31/00; H02P 29/024; H02K 1/27; H02K 15/03; H02K 11/20; H01F 13/003
USPC ........................................................ 335/284
See application file for complete search history.

(56) References Cited

U.S. PATENT DOCUMENTS

| | | | | |
|---|---|---|---|---|
| 6,822,418 B2* | 11/2004 | Harke | ....................... | H02P 6/18 318/700 |
| 7,459,821 B2* | 12/2008 | Cheong | ................. | H01F 13/003 310/156.53 |
| 7,876,019 B2 | 1/2011 | Calley | | |
| 8,030,817 B2* | 10/2011 | Sakai | ................... | H02K 1/2766 310/156.43 |
| 8,327,670 B2* | 12/2012 | Maekawa | ............. | D06F 37/304 318/701 |
| 10,146,211 B2* | 12/2018 | Fukushige | ............ | B60L 15/025 |

FOREIGN PATENT DOCUMENTS

| GB | 2417613 B | 11/2006 |
|---|---|---|
| WO | 2015038124 A1 | 3/2015 |
| WO | 2017023249 A1 | 2/2017 |

* cited by examiner

*Primary Examiner* — Burton S Mullins
(74) *Attorney, Agent, or Firm* — Taft Stettinius & Hollister LLP; J. Bruce Schelkopf

(57) ABSTRACT

A method for operating an electrical machine having a stator and having a rotor with permanent magnets, includes: running the electrical machine; determining, while performing the running of the electrical machine, whether the permanent magnets have been demagnetized; finding, while running the electrical machine, the q-axis responsive to a determination that the permanent magnets have been demagnetized; firing a current pulse through the stator, while running the electrical machine, when the q-axis reaches a desired position relative to a selected stator phase, wherein the current pulse is constructed to remagnetize the permanent magnets; and continuing to run the electrical machine.

35 Claims, 4 Drawing Sheets

ELECTRICAL MACHINE AND METHOD FOR OPERATING AN ELECTRICAL MACHINE

TECHNICAL FIELD

The present application generally relates to electrical machines, and more particularly, but not exclusively, to electrical machines and methods for operating electrical machines.

BACKGROUND

Electrical machines remain an area of interest. Some existing systems have various shortcomings, drawbacks and disadvantages relative to certain applications. For example, in some electrical machines, permanent magnets may become demagnetized. Accordingly, there remains a need for further contributions in this area of technology.

SUMMARY

One embodiment of the present invention is a unique method for operating an electrical machine. Another embodiment is a unique electrical machine. Other embodiments include apparatuses, systems, devices, hardware, methods, and combinations for electrical machines. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
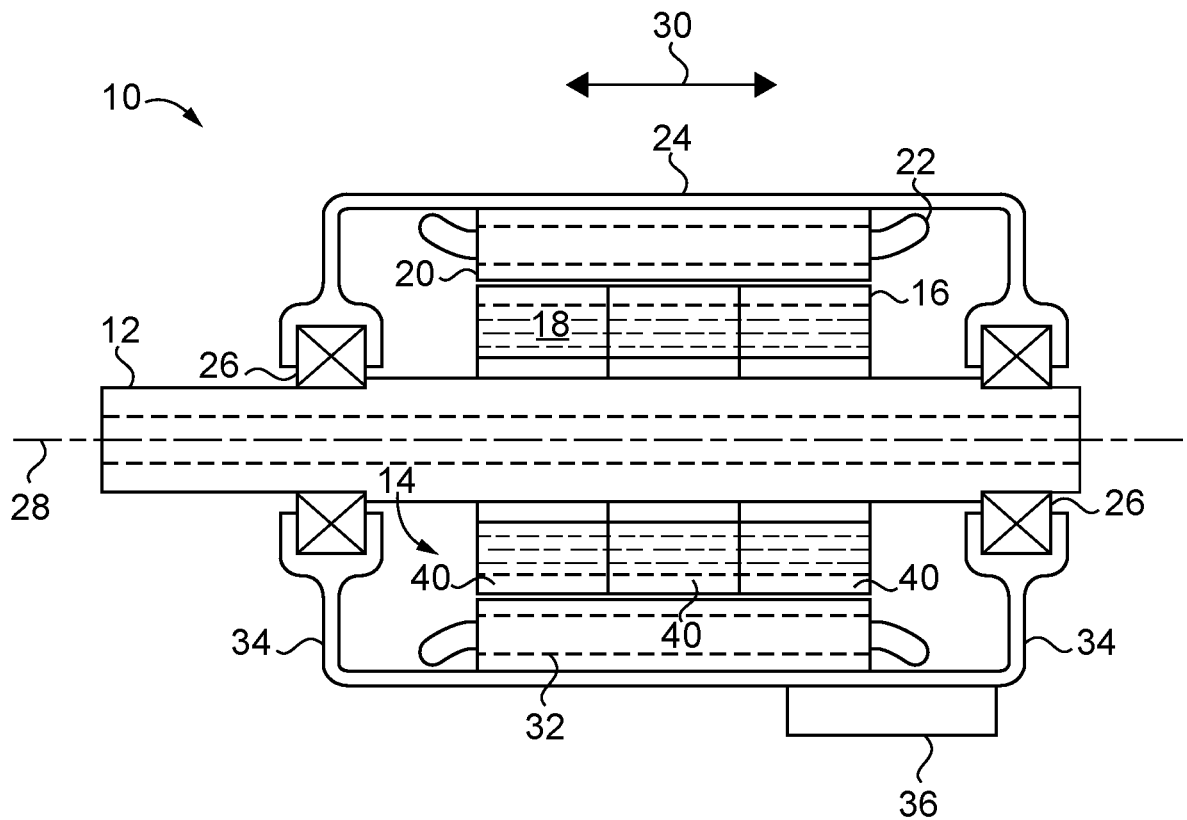
FIG. 1 schematically depicts some aspects of a non-limiting example of an electrical machine in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to the drawings, and in particular FIG. 1, some aspects of a non-limiting example of an electrical machine 10 in accordance with an embodiment of the present invention are schematically depicted. In one form, electrical machine 10 is a 3-phase machine. In other embodiments, electrical machine 10 may be a single-phase machine, or may have any number of phases. In one form, electrical machine 10 is a permanent magnet assisted synchronous reluctance motor. In other embodiments, electrical machine 10 may be a motor and/or a generator, and may be any type of motor, generator or motor/generator that includes permanent magnets. In various embodiments, electrical machine 10 may be a radial flux machine, an axial flux machine or a machine having a three-dimensional (3D) flux path. Electrical machine 10 includes a shaft 12, a rotor 14 having poles 16 that include permanent magnets 18, a stator 20 having stator windings 22, a housing 24 and bearings 26. Shaft 12 and rotor 14 rotate about an axis of rotation 28, which defines an axial direction 30.

Shaft 12 is constructed to support rotor 14 and react radial and axial or thrust loads from rotor 14. In one form, shaft 12 is operative to transmit mechanical power from electrical machine 10 as an output of electrical machine 10. In other embodiments, shaft 12 may be operative to transmit mechanical power to and/or from electrical machine 10. Shaft 12 is axially and radially positioned by bearings 26. Shaft 12 and bearings 26 define axis of rotation 28 and corresponding axial direction 30.

Rotor 14 and stator 20 are in magnetic communication with each other. Each of rotor 14/poles 16 and stator 20 have a construction that is operative to direct magnetic flux toward and from each other. In some embodiments, rotor 14 may include other operative sources of magnetic flux, e.g., bus bars, windings or both, in conjunction with permanent magnets 18.

Stator windings 22 are disposed within passages 32 in stator 20. Stator windings 22 may be distributed in composition. In one form, stator windings 22 are copper conductors. In other embodiments, aluminum and/or other conductor materials may be employed in addition to or in place of copper. Windings 22 are constructed for magnetic communication with poles 16. In one form, passages 32 are linear, and extend through the length of stator 20 in axial direction 30. In other embodiments, passages 32 may be skewed, may be radial passages or may be passages having a centerline that extends in any two or more of axial, radial and circumferential directions through all or part of stator 20. In some embodiments, stator 20 may include other passages in addition to passages 32, e.g., cooling passages or other passages. In some embodiments, passages 32 may be also constructed to allow a flow of a cooling medium therethrough.

In one form, bearings 26 are mounted in and supported by end plates 34 of housing 24. In some embodiments, one or both end plates 34 may be integral with housing 24. In some embodiments, bearings 26 may be mounted and coupled to housing 24 via one or more other structures and/or integral features of housing 24. Bearings 26 are constructed to react shaft 12 and rotor 14 axial or thrust loads in direction 30, and to react shaft 12 and rotor 14 radial loads perpendicular to axis of rotation 28. Housing 24 is constructed to enclose stator 20 and react loads associated with stator 20, e.g., loads generated due to magnetic interaction between stator 20 and rotor 14. Electrical machine 10 includes a drive 36 operative to control current flow through stator windings 22. In one form, drive 36 is mounted on housing 24. In other embodiments, drive 36 may be remotely located.

In one form, permanent magnets 18 are polymer bonded permanent magnets (PBM). In other embodiments, other types of magnets or magnetic material may be employed. For example, in some embodiments, permanent magnets 18 may be sintered, and, e.g., inserted mechanically or manually. In one form, permanent magnets 18 use a polymer/epoxy resin matrix to bond magnetic powders, e.g., magnetic particles in powder form. In other embodiments, other matrix materials may be employed. In still other embodiments, matrix materials may not be present. The magnetic properties of PBMs are determined by the magnetic powder or particles, its content and interaction with the matrix. In some embodiments, thermoplastic polymers may be injection molded to form permanent magnets 18. For example, in one form, PBM is directly injected into cavities in rotor 14, e.g., rotor cavities or passages, to form permanent magnets 18. In other embodiments, other techniques may be employed to form permanent magnets 18 inside the rotor cavities or passages. For example, compression molding may be employed, wherein the cavities are filled with the permanent magnet material. The permanent magnet material is subsequently solidified, e.g., by curing, after saturation and/or alignment (described below) to form permanent magnets 18. In other embodiments, the manner of placement of permanent magnets 18 may vary, and, for example, may not employ injection molding or compression molding. For example, permanent magnets 18 may be manually or mechanically placed in, on or about rotor 14, and/or may be secured to rotor 14 and/or within passages 48 by one or more of various means.

In one form, the magnetic powder or particle used to form permanent magnets 18 is ferrite, e.g., ferrite powder. In other embodiments the magnetic particles or powder may also or alternatively be or include Nd—Fe—B (neodymium-iron-boron), Sm—Fe—N (samarium-iron-nitrogen), Sm—Co (samarium-cobalt), and/or their mixtures. In other embodiments, other magnetic powder or particle materials may also or alternatively be employed. In one form, the polymeric matrix may be or include nylon, polypropylene and/or polyphenylene-sulfide. In other embodiments, other polymeric matrix materials may be employed. Permanent magnets 18 are thus formed in and/or inserted into rotor cavities (e.g., passages 48, described below with respect to FIG. 2).

Figure 2:
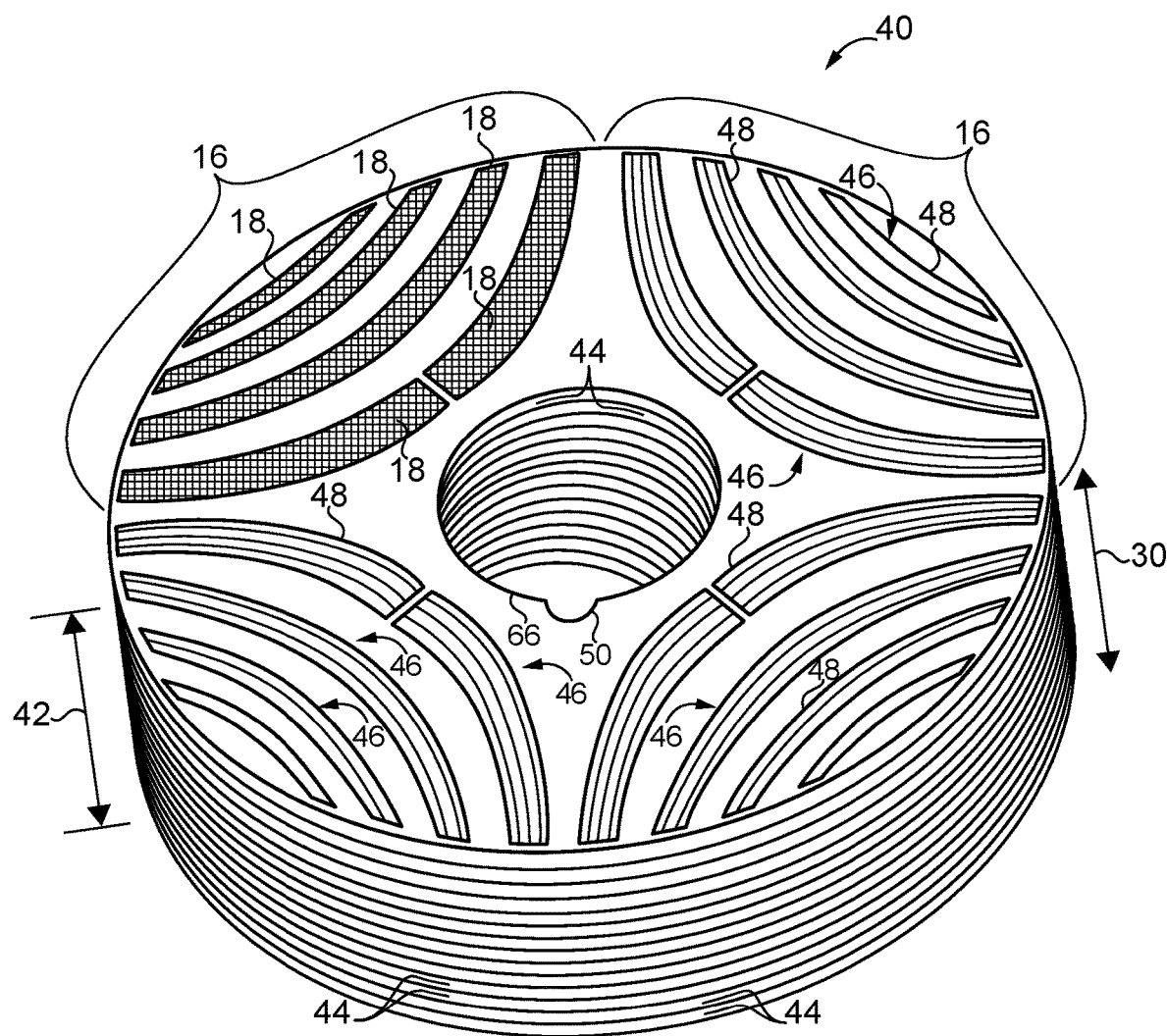
FIG. 2 illustrates some aspects of a non-limiting example of a portion of a rotor in accordance with an embodiment of the present invention.

Referring to FIG. 2, some aspects of a non-limiting example of an axial rotor segment 40 in accordance with an embodiment of the present invention is illustrated. Rotor 14 may be formed as a single unified structure formed from laminations, or may be formed of a plurality of rotor segments 40, wherein each rotor segment 40 is formed of a plurality of laminations, and wherein the segments 40 are combined together to form rotor 14. The example illustrated in FIG. 1 employs three (3) such axial rotor segments 40. The number of rotor segments 40 in any particular rotor 14 may vary with the needs of the application. In the illustrated example, the number of poles 16 is four (4). The number of poles 16 in any particular rotor 14 may vary with the needs of the application.

Each rotor segment 40 has a length 42 in the axial direction 30. Rotor segment 40 is formed of a plurality of rotor laminations 44. In one form, rotor laminations 44 are stacked together to form each axial rotor segment 40. Each rotor segment 40 is formed of at least two laminations 44. The length 42 may be determined, for example, by the number and thickness of the rotor laminations. In one form, rotor laminations 44 are 0.5 mm thick. In other embodiments, other thickness values may be employed.

Each rotor lamination 44 has a plurality of openings or slots 46 therein, e.g., curvilinear slots, although other slot shapes or configurations may be used in other embodiments. Slots 46 form a plurality of rotor poles 16 in the rotor segment 40, each pole 16 having a plurality of passages 48 formed from the slots 46. Passages 48 extend from one end of rotor segment 40 through to the opposite end. In the depiction of FIG. 2, the passages 48 for one pole 16 have been injection molded with PBM to form permanent magnets 18, whereas the other three (3) poles 16 have not yet been injection molded, in order to clarify the locations of slots 46 and passages 48.

The addition of permanent magnets into the synchronous reluctance machine structure improves the performance of the electrical machine, including PF (power factor) enhancement with loss reduction. Although different magnetic materials may be employed, the lowest cost permanent magnet material available is generally ferrites, e.g., ferrite powder or particles. However, ferrites have a low resistance to demagnetization, i.e., have low coercivity This low coercivity affects electrical machines such as permanent magnet-assisted synchronous reluctance machines with demagnetization, resulting in return to basic synchronous reluctance machine capability. Other magnetic materials may also be demagnetized, for example, rare earth materials, although, higher temperatures and/or applied magnetic fields are typically required for demagnetization of rare earth materials than for ferrites, except Nd—Fe—B, which may become demagnetized at lower temperatures then ferrites. Permanent magnets typically become demagnetized due to a combination of overload (e.g., overload of the electrical machine) and temperature. In some cases, the electrical machine may have been purposefully demagnetized, e.g., for shipping or other reasons. Embodiments of the present invention includes an electrical machine and drive, where the drive is constructed to monitor and correct (e.g., via stator current only) the flux provided by the permanent magnets with an operating machine, i.e., "on-the-fly" remagnetization of partially or fully demagnetized permanent magnets, such as permanent magnets 18. "On the fly" remagnetization refers to performing the remagnetization performed while electrical machine 10 is running during normal production operations.

Thus, for example, embodiments of the present invention may monitor electrical machine 10; if it is determined that the permanent magnets have been fully or partially demagnetized, current, e.g., in the form of a current pulse of one or more particular magnitudes and durations, may be supplied to the stator 20 at a selected point during the operation of electrical machine 10 in order to remagnetize the demagnetized permanent magnets 18.

Accordingly, rotor 14 may be a magnetic structure that is more prone to demagnetization than typical rotors (e.g., thinner permanent magnets, further reducing cost). A synchronous reluctance motor has a 'limp home' capability even if the permanent magnets are substantially demagnetized, due to the saliency torque capability. Therefore if certain conditions are required to fully remagnetize the rotor, the process in which the motor is installed may, for some embodiments, be modified to allow for remagnetization.

Figure 3:
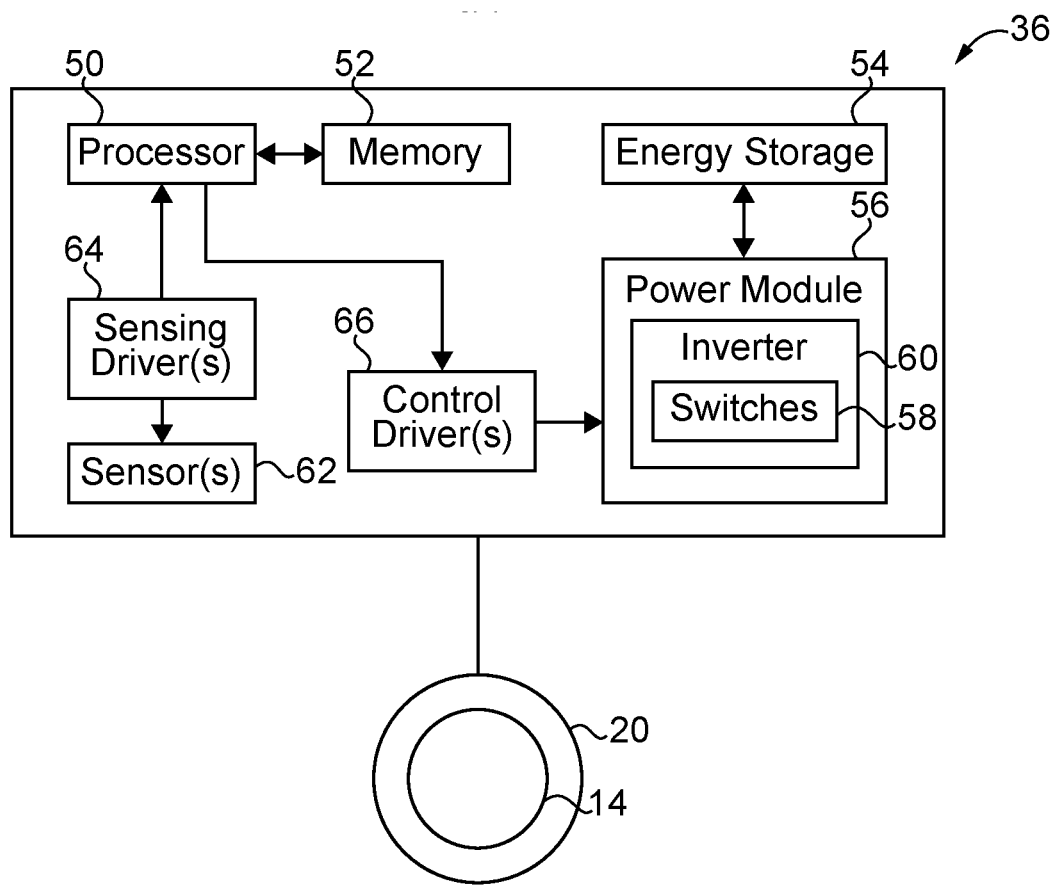
FIG. 3 schematically illustrates some aspects of a non-limiting example of a drive for an electrical machine in accordance with an embodiment of the present invention.

Referring to FIG. 3, drive 36 is includes a combination of hardware and software. The hardware includes processor 50; a non-transitory computer readable storage medium, such as a memory 52; one or more energy storage devices 54, e.g., capacitors and/or other energy storage devices; a power electronics module 56 or power module 56 having a plurality of switching devices or switches 58, e.g., at least some of which are part of an inverter 60; one or more sensors 62 in some embodiments; one or more sensing drivers 64 for embodiments having sensor(s) 60; and one or more control drivers 66. Memory 52 stores software, i.e., computer readable program instructions, for performing various operations of electrical machine 10. In some embodiments, the computer readable program instructions may be in firmware in addition to or in place of being software.

Processor 50 is operative to control the output of power module 56, e.g., by controlling control drivers 66, which provide gate drive signals to switches 58 for controlling the current flow through stator 20. Sensing driver(s) 64 is operative to provide input to processor 50 based on the output of sensor(s) 62. In some embodiments, one or more sensors 62 may be used to detect or determine rotor 14 position (electrical rotational position). Sensors 62 may be or include, for example, one or more resolvers, one or more encoders and/or one or more Hall Effect sensors. Some embodiments may not use sensors to directly detect or sense rotor position. For example, some embodiments may employ software and/or firmware implementations of observers to determine rotor 14 position, e.g., based on measured or sensed current and/or voltage using one or more current and/or voltage sensors 62.

Energy storage elements 54 are operative to provide stored energy to power module 56, e.g., for remagnetizing permanent magnets 18. For example, in some embodiments, energy from energy storage elements 54, e.g., including capacitors, is channeled through power electronics module 56 to stator 20, such that the current, e.g., 3-phase current, has the desired orientation and amplitude. In some embodiments, the orientation of the current in stator 20 may be used to decelerate electrical machine 10, converting the mechanical energy of electrical machine 10 and equipment driven by electrical machine 10 to electrical energy, which is used to remagnetize permanent magnets 18. A phase synchronous control enables rotor 14 to obtain enough current for remagnetizing, for example, by applying a voltage vector in relation to the q-axis such as to increase q-axis current to a desired remagnetization amplitude.

Figure 4:
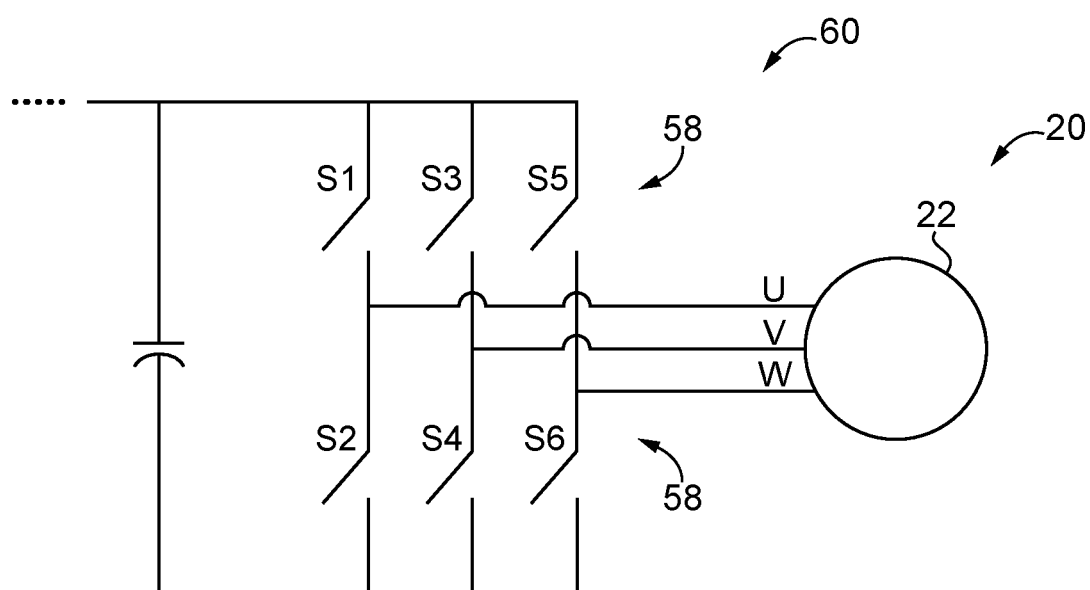
FIG. 4 schematically illustrates some aspects of a non-limiting example of an inverter in accordance with an embodiment of the present invention.

Referring to FIG. 4, some aspects of a non-limiting example of inverter 60 in accordance with an embodiment of the present invention is schematically illustrated. Electrical machine 10 is a 3-phase machine having U, V and W stator phases. Switches 58 are designated S1, S2, S3, S4, S5 and S6 in inverter 60, and perform the electrical switching to provide the 3-phase operation of stator 20/electrical machine 10. In the illustration of FIG. 4, switches S1-S6 are in the open position, and hence, electrical machine 10 is not running.

Figure 5:
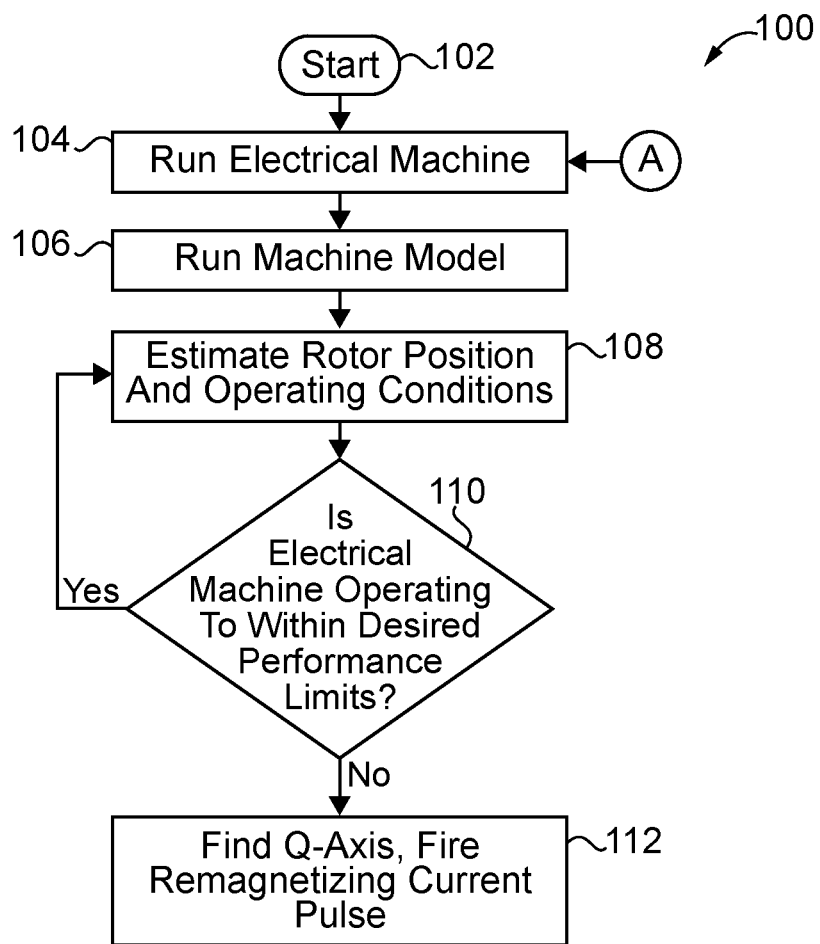
FIG. 5 illustrates some aspects of a non-limiting example of a flowchart depicting the operation of an electrical machine in accordance with an embodiment of the present invention.

Referring to FIG. 5, some aspects of a non-limiting example of a flowchart 100 depicting the operation of electrical machine 10 is illustrated in accordance with an embodiment of the present invention. Embodiments of the present invention are operative to remagnetize demagnetized permanent magnets 118, which in some embodiments allows the use of low cost thin ferrite magnets, in contrast to thicker magnets and/or rare earth magnets. Some embodiments of the present invention may be used in conjunction with rare earth magnets in addition to or in place of ferrite magnets.

Process flow begins at block 102. At block 104, electrical machine 10 is run as part of normal production operation, i.e., run as part of the installed and in-service production operation of electrical machine 10 for the purchaser or end-user of electrical machine 10. While electrical machine 10 is running, e.g., as part of normal production operation, drive 36 determines whether permanent magnets 18 have been demagnetized. This determination may be made in more than one manner in accordance with embodiments of the present invention, e.g., as described herein.

At block 106, processor 50 executes program instructions stored in a memory such as memory 52 to run a machine model of electrical machine 10. The machine model is an electronic model of electrical machine 10. The machine model is run as part of the normal operation of electrical machine 10, and is kept running for as long as electrical machine 10 is kept running.

At block 108, processor 50 executes program instructions to estimate rotor 14 position, and to estimate the operating conditions of electrical machine 10, e.g., based on the machine model. For example, in some embodiments, sensed operating conditions may be compared to operating conditions predicted by the machine model. The operating conditions may be or include, for example, an estimation or determination of the electrical machine power factor (PF), or an estimation or determination of the back-emf of electrical machine 10. The power factor may be determined, for example, based on direct or indirect measurement of applied voltage and resultant current, relative to power conversion, or may employ high frequency methods. Back-emf monitoring may include determining if the magnitude of the back-emf differs from a predetermined value, e.g., is less than a predetermined value.

At block 110, processor 50 executes program instructions to determine whether electrical machine 10 is operating within desired performance limits, based on the operating conditions estimated at block 104, or more particularly, to determine whether the permanent magnets have been partially or completely demagnetized. This may be based on, for example, on the running of the machine model, or the output of the machine model, being compared to sensed or otherwise determined electrical machine 10 data. For example, in some embodiments, determining whether electrical machine 10 is operating within desired performance limits based on the estimated operating conditions includes determining whether a power factor for the electrical machine is less than a predetermined power factor. For example, in some embodiments, partial demagnetization at rated load may be indicated by a power factor in the range of 0.85 to 0.95. Thus, electrical machine 10 may be determined to be not operating within the desired performance limits if the power factor is 0.85 to 0.95 or less. Similarly, complete demagnetization at rated load may result in a power factor in the range of 0.55 to 0.75. Thus, electrical machine 10 may be determined to be not operating within the desired performance limits if the power factor is 0.55 to 0.75 or less. The determined or measured power factor may be indicative of the presence and degree of demagnetization of permanent magnets 18, and be used by processor 50 to determine the magnitude and/or duration of the remagnetizing current pulse sent to stator 20 (i.e., stator windings 22) to remagnetize permanent magnets 18.

Another method of determining whether electrical machine is operating within desired performance limits, more particularly, determining whether permanent magnets 18 have been completely or partially demagnetized, based on the operating conditions estimated at block 104, includes determining whether a back-emf is less than a predetermined back-emf value. This methodology may be used alone or in conjunction with determinations made based on power factor. For example, in some implementations, at least partial demagnetization may be manifested by electrical machine 10 having a back-emf of 90% of a nominal back-emf for the particular electrical machine 10 or less. Thus, electrical machine 10 may be determined to be not operating within desired performance limits if the back-emf is 90% of a nominal back-emf or less. In such embodiments, the threshold for remagnetization may thus be a back-emf of 90% of a nominal back-emf or less. In other embodiments, electrical machine 10 may be determined to be not operating within desired performance limits if the back-emf is 75% of a nominal back-emf or less, and hence, the threshold for remagnetization may be a back-emf of 75% of a nominal back-emf or less. In still other embodiments, electrical machine 10 may be determined to be not operating within desired performance limits if the back-emf is 50% of a nominal back-emf or less, and hence, the threshold for remagnetization may be a back-emf of 50% of a nominal back-emf or less. The back-emf comparison to nominal may be indicative of the presence and degree of demagnetization of permanent magnets 18, and may be used by processor 50 to determine the magnitude and/or duration of the remagnetizing current pulse sent to stator 20 (i.e., stator windings 22) to remagnetize permanent magnets 18.

If at block 110 electrical machine 10 is determined to be operating within desired performance limits, process flow proceeds back to block 108. Process flow loops between block 108 and block 110 for as long as electrical machine 10 is determined to be operating within desired performance limits. If at block 110, electrical machine 10 is determined to not be operating within desired performance limits, process flow proceeds to block 112.

At block 112, processor 50 executes program instructions to find the q-axis responsive to a determination that the permanent magnets 18 have become partially or fully demagnetized. This is performed while electrical machine 10 is running, e.g., during normal production operations. In some embodiments, this may be performed at block 108.

Processor 50 also executes program instructions to fire a current pulse through stator 20 when the q-axis reaches a desired position relative to a selected stator 20 phase. Thus current pulse is constructed to remagnetize permanent magnets 18 after they have been partially or fully demagnetized. This is also performed while electrical machine 10 is running, e.g., during normal production operations. The current pulse is controlled by inverter 60 switches 58 based on gate drive signals sent by control driver 66 at the direction of processor 50 and the program instructions. In one form, the W phase of stator 20 is the selected stator phase. In other embodiments, the U or V stator phases may be selected.

Figure 6:
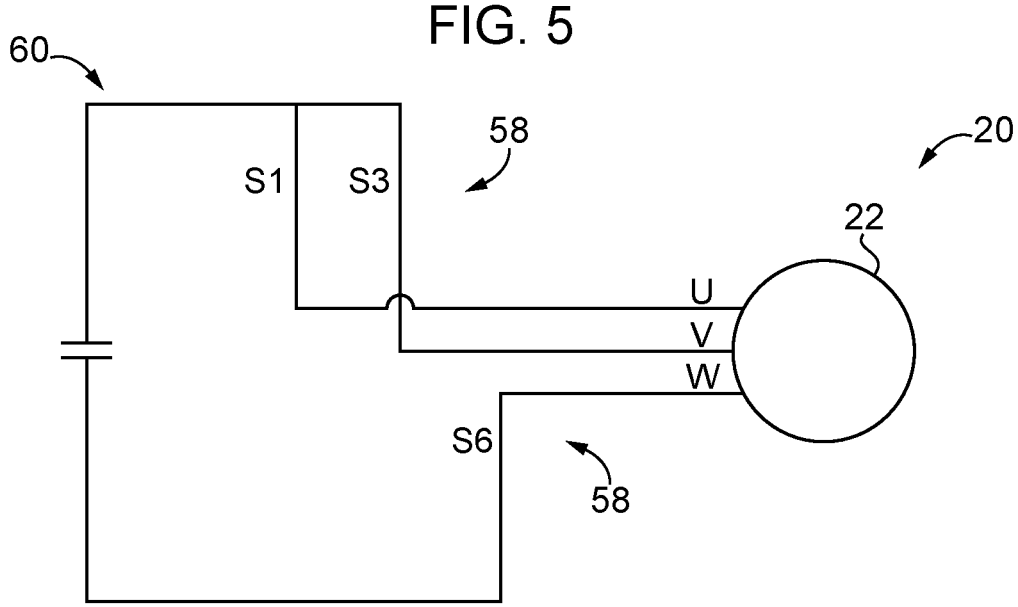
FIG. 6 schematically illustrates some aspects of a non-limiting example of inverter switch positions while firing a remagnetizing current pulse in accordance with an embodiment of the present invention.

Referring to FIG. 6 in conjunction with FIG. 5, some aspects of a non-limiting example of inverter 60 switch 58 positions while firing the remagnetizing current pulse are schematically illustrated in accordance with an embodiment of the present invention. In the illustration of FIG. 6, switches 58 labeled S1, S3 and S6 are closed. Switches S2, S4 and S5 are open, and are omitted from the drawing. The pulse is fired such that peak current is obtained when the q axis of the rotor reaches a desired position relative to the selected stator phase, e.g., the W phase in the illustration of FIG. 6. Due to winding connections, in one non-limiting example, current that goes in (or out) of the W phase must go out (or in) of the U and V phases. Thus, in FIG. 6, switches S1, S3, & S6 are on (closed) and the current pulse fired when the q axis reaches the desired position relative to the W stator phase. In other embodiments, other combinations of switches may be employed. In one non-limiting example, depending upon timing, switches S1, S5, and S4 may also be an option, as well as S2, S3, & S5, for firing the remagnetizing current pulse. In some embodiments, one switch 58 on the bottom of inverter 60 is on (closed), and the top side switches 58 are on (closed) for the other phases in order to fire the current pulse. In other embodiments, a single switch 58 on top may be on (closed), while two other switches on bottom side of inverter 60 are on (closed) in order to fire the pulse. In other embodiments, a single switch 58 on top may be on (closed), while one switch on bottom side of inverter 60 is on (closed) in order to fire the pulse. In other embodiments, a single switch 58 on bottom may be on (closed), while one switch on the top side of inverter 60 is on (closed) in order to fire the pulse.

In one form, the duration of the current pulse is between 1 ms and 200 ms. The duration of the pulse may vary with the needs of the application, e.g., based upon the degree of demagnetization of permanent magnets 18 and DC bus voltage in inverter 60. In other embodiments, the current pulse may be outside this range. In some embodiments, the current pulse may be fired when the q-axis is aligned with the selection stator phase. In other embodiments, in order to reduce or eliminate any potential electrical machine 10 torque fluctuation stemming from the current pulse, the current pulse may be fired when q-axis is out of alignment with the selected stator phase. For example, in one form, the current pulse is fired when the q-axis is in a target region of +/−10 electrical degrees away from alignment with the selected stator phase. In some embodiments, the target region may be +/−25 electrical degrees away from alignment with the selected stator phase. In other embodiments, the target region may be +/−45 electrical degrees away from alignment with the selected stator phase. In other embodiments, the orientation of the current pulse may be selected for regeneration during the pulse, converting kinetic energy of the motor and load to electrical energy for remagnetization.

In one form, amplitude of the current pulse is between 1.1 and 10 times the amount of current required to operate electrical machine 10. The amount of current required to operate electrical machine 10 is the electrical machine 10 nominal current to obtain rated torque at rated speed. In a particular embodiment, the current pulse has an amplitude of 5.5 or approximately 5.5 times the amount of current required to operate electrical machine 10. Stated differently, in some embodiments, the current pulse has an amplitude of in the range of 2-25 times the rated current for the electrical machine 10, and in other embodiments, has an amplitude in the range of 5-25 times the rated current. In still other embodiments, the current pulse has an amplitude in the range of 3-15 times the rated current for the electrical machine 10. In yet other embodiments, the current pulse has an amplitude in the range of 4-9 times the rated current for the electrical machine 10. Before, during and after firing the remagnetizing current pulse, electrical machine 10 continues running, e.g., as part of or during normal production operations. In some embodiments, the remagnetization may be performed with rotor 14 stopped, e.g., locked. The process of blocks 104-112 are repeated as long as electrical machine 10 is running.

Embodiments of the present invention include a method for operating an electrical machine having a stator and having a rotor with permanent magnets, comprising: running the electrical machine; determining, while performing the running of the electrical machine, whether the permanent magnets have been demagnetized; finding, while running the electrical machine, the q-axis responsive to a determination that the permanent magnets have been demagnetized; firing a current pulse through the stator, while running the electrical machine, when the q-axis reaches a desired position relative to a selected stator phase, wherein the current pulse is constructed to remagnetize the permanent magnets; and continuing to run the electrical machine.

In a refinement, the determining whether the permanent magnets have been demagnetized includes estimating operating conditions of the electrical machine while running the electrical machine.

In another refinement, the determining whether the permanent magnets have been demagnetized includes determining, while running the electrical machine, whether the electrical machine is operating within desired performance limits based on the estimated operating conditions.

In yet another refinement, the determining whether the electrical machine is operating within desired performance limits based on the estimated operating conditions includes determining whether a power factor for the electrical machine is less than a predetermined power factor.

In still another refinement, the electrical machine is determined to be not operating within the desired performance limits if the power factor is 0.85 to 0.95 or less.

In yet still another refinement, the electrical machine is determined to be not operating within the desired performance limits if the power factor is 0.55 to 0.75 or less.

In a further refinement, the determining whether the electrical machine is operating within the desired performance limits based on the estimated operating conditions includes determining whether a back-emf is less than a predetermined back-emf value.

In another further refinement, the electrical machine is determined to be not operating within desired performance limits if the back-emf is 90% of a nominal back-emf or less.

In a yet further refinement, the electrical machine is determined to be not operating within desired performance limits if the back-emf is 75% of a nominal back-emf.

In a still further refinement, the electrical machine is determined to be not operating within desired performance limits if the back-emf is less than 50% of a nominal back-emf or less.

In a yet still further refinement, the running of the electrical machine is performed as a normal production operation of the electrical machine.

In an additional refinement, the method further comprises estimating rotor position.

In another additional refinement, the method further comprises running a machine model of the electrical machine while running the electrical machine, wherein the determining whether the permanent magnets have been demagnetized is based on the running of the machine model of the electrical machine.

In yet another additional refinement, the electrical machine is a 3-phase machine; wherein the firing of the current pulse through the stator is performed when a q-axis reaches a desired position relative to a selected stator phase.

In still another additional refinement, the desired position of the q-axis relative to the selected stator phase is within +/−10 electrical degrees of alignment of the q-axis with the selected stator phase.

In yet still another additional refinement, the desired position of the q-axis relative to the selected stator phase is within +/−25 electrical degrees of alignment of the q-axis with the selected stator phase.

In a further additional refinement, the desired position of the q-axis relative to the selected stator phase is within +/−45 electrical degrees of alignment of the q-axis with the selected stator phase.

In another further additional refinement, the current pulse has an amplitude of between 1.1 and 10 times the amount of current required to operate the electrical machine.

In yet another further additional refinement, the current pulse has an amplitude of approximately 5.5 times the amount of current required to operate the electrical machine.

In still another further additional refinement, the current pulse has an amplitude of 2-25 times a rated current for the electrical machine.

In yet still another further additional refinement, the current pulse has an amplitude of 3-15 times a rated current for the electrical machine.

In a further refinement, the current pulse has an amplitude of 4-9 times a rated current for the electrical machine.

Embodiments of the present invention include an electrical machine, comprising: a stator having a plurality of stator windings; a rotor having a plurality of permanent magnets; and a motor drive having a processor operative to execute program instructions to: determine, while running the electrical machine, whether the permanent magnets have been demagnetized; finding, while running the electrical machine, the q-axis responsive to a determination that the permanent magnets have been demagnetized; and firing a current pulse through the stator, while running the electrical machine, when the q-axis reaches a desired position relative to a selected stator phase, wherein the current pulse is constructed to remagnetize the permanent magnets.

In a refinement, the determining of whether the permanent magnets have been demagnetized includes estimating operating conditions of the electrical machine while running the electrical machine.

In another refinement, the determining whether the permanent magnets have been demagnetized includes determining whether the electrical machine is operating within desired performance limits based on the estimated operating conditions.

In yet another refinement, the determining whether the electrical machine is operating within desired performance limits based on the estimated operating conditions includes determining whether the power factor for the electrical machine is less than a predetermined power factor.

In still another refinement, the electrical machine is determined to be not operating within desired performance limits if the power factor is less than 0.85.

In yet still another refinement, the determining whether the electrical machine is operating within predetermined desired performance limits based on the estimated operating conditions includes determining whether a back-emf is less than a predetermined back-emf value.

In a further refinement, the electrical machine is determined to not be operating within predetermined desired performance limits if the back-emf is less than 90% of a nominal back-emf.

In a yet further refinement, the processor is operative to execute program instructions to run a machine model of the electrical machine while running the electrical machine, wherein the determining whether the permanent magnets have been demagnetized is based on the running of the machine model of the electrical machine; and to estimate rotor position.

In a still further refinement, the running of the electrical machine is performed during normal production operations of the electrical machine.

In a yet still further refinement, the electrical machine is a 3-phase machine; and wherein the firing of the current pulse through the stator is performed when the q-axis reaches a desired degree of alignment with a selected stator phase.

In another further refinement, the desired position of the q-axis relative to the selected stator phase is within +/−10 electrical degrees of alignment of the q-axis with the selected stator phase.

In yet another further refinement, the current pulse has an amplitude of at least 4-9 times a rated current for the electrical machine.

In still another further refinement, the current pulse has a duration of between 1 and 200 ms.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method for operating an electrical machine having a stator and having a rotor with permanent magnets, comprising:
running the electrical machine;
determining, while performing the running of the electrical machine, whether the permanent magnets have been demagnetized;
finding, while running the electrical machine, the q-axis responsive to a determination that the permanent magnets have been demagnetized;
firing a current pulse through the stator, while running the electrical machine, when the q-axis reaches a desired position relative to a selected stator phase, wherein the current pulse is constructed to remagnetize the permanent magnets; and
continuing to run the electrical machine.

2. The method of claim 1, wherein the determining whether the permanent magnets have been demagnetized includes estimating operating conditions of the electrical machine while running the electrical machine.

3. The method of claim 2, wherein the determining whether the permanent magnets have been demagnetized includes determining, while running the electrical machine, whether the electrical machine is operating within desired performance limits based on the estimated operating conditions.

4. The method of claim 3, wherein the determining whether the electrical machine is operating within desired performance limits based on the estimated operating conditions includes determining whether a power factor for the electrical machine is less than a predetermined power factor.

5. The method of claim 4, wherein the electrical machine is determined to be not operating within the desired performance limits if the power factor is 0.85 to 0.95 or less.

6. The method of claim 4, wherein the electrical machine is determined to be not operating within the desired performance limits if the power factor is 0.55 to 0.75 or less.

7. The method of claim 3, wherein the determining whether the electrical machine is operating within the desired performance limits based on the estimated operating conditions includes determining whether a back-emf is less than a predetermined back-emf value.

8. The method of claim 7, wherein the electrical machine is determined to be not operating within desired performance limits if the back-emf is 90% of a nominal back-emf or less.

9. The method of claim 7, wherein the electrical machine is determined to be not operating within desired performance limits if the back-emf is 75% of a nominal back-emf.

10. The method of claim 7, wherein the electrical machine is determined to be not operating within desired performance limits if the back-emf is less than 50% of a nominal back-emf or less.

11. The method of claim 1, wherein the running of the electrical machine is performed as a normal production operation of the electrical machine.

12. The method of claim 1, further comprising estimating rotor position.

13. The method of claim 1, further comprising running a machine model of the electrical machine while running the electrical machine, wherein the determining whether the permanent magnets have been demagnetized is based on the running of the machine model of the electrical machine.

14. The method of claim 1, wherein the electrical machine is a 3-phase machine;
wherein the firing of the current pulse through the stator is performed when a q-axis reaches a desired position relative to a selected stator phase.

15. The method of claim 14, wherein the desired position of the q-axis relative to the selected stator phase is within +/−10 electrical degrees of alignment of the q-axis with the selected stator phase.

16. The method of claim 14, wherein the desired position of the q-axis relative to the selected stator phase is within +/−25 electrical degrees of alignment of the q-axis with the selected stator phase.

17. The method of claim 14, wherein the desired position of the q-axis relative to the selected stator phase is within +/−45 electrical degrees of alignment of the q-axis with the selected stator phase.

18. The method of claim 1, wherein the current pulse has an amplitude of between 1.1 and 10 times the amount of current required to operate the electrical machine.

19. The method of claim 18, wherein the current pulse has an amplitude of approximately 5.5 times the amount of current required to operate the electrical machine.

20. The method of claim 18, wherein the current pulse has an amplitude of 2-25 times a rated current for the electrical machine.

21. The method of claim 18, wherein the current pulse has an amplitude of 3-15 times a rated current for the electrical machine.

22. The method of claim 18, wherein the current pulse has an amplitude of 4-9 times a rated current for the electrical machine.

23. An electrical machine, comprising:
a stator having a plurality of stator windings;
a rotor having a plurality of permanent magnets; and
a motor drive having a processor operative to execute program instructions to:
determine, while running the electrical machine, whether the permanent magnets have been demagnetized;
finding, while running the electrical machine, the q-axis responsive to a determination that the permanent magnets have been demagnetized; and
firing a current pulse through the stator, while running the electrical machine, when the q-axis reaches a desired position relative to a selected stator phase, wherein the current pulse is constructed to remagnetize the permanent magnets.

24. The electrical machine of claim 23, wherein the determining of whether the permanent magnets have been demagnetized includes estimating operating conditions of the electrical machine while running the electrical machine.

25. The electrical machine of claim 24, wherein the determining whether the permanent magnets have been demagnetized includes determining whether the electrical machine is operating within desired performance limits based on the estimated operating conditions.

26. The electrical machine of claim 25, wherein the determining whether the electrical machine is operating within desired performance limits based on the estimated operating conditions includes determining whether the power factor for the electrical machine is less than a predetermined power factor.

27. The electrical machine of claim 26, wherein the electrical machine is determined to be not operating within desired performance limits if the power factor is less than 0.85.

28. The electrical machine of claim 25, wherein the determining whether the electrical machine is operating within predetermined desired performance limits based on the estimated operating conditions includes determining whether a back-emf is less than a predetermined back-emf value.

29. The electrical machine of claim 28, wherein the electrical machine is determined to not be operating within predetermined desired performance limits if the back-emf is less than 90% of a nominal back-emf.

30. The electrical machine of claim 23, wherein the processor is operative to execute program instructions to run a machine model of the electrical machine while running the electrical machine, wherein the determining whether the permanent magnets have been demagnetized is based on the running of the machine model of the electrical machine; and to estimate rotor position.

31. The electrical machine of claim 23, wherein the running of the electrical machine is performed during normal production operations of the electrical machine.

32. The electrical machine of claim 23, wherein the electrical machine is a 3-phase machine; and wherein the firing of the current pulse through the stator is performed when the q-axis reaches a desired degree of alignment with a selected stator phase.

33. The electrical machine of claim 32, wherein the desired position of the q-axis relative to the selected stator phase is within +/−10 electrical degrees of alignment of the q-axis with the selected stator phase.

34. The electrical machine of claim 23, wherein the current pulse has an amplitude of at least 4-9 times a rated current for the electrical machine.

35. The electrical machine of claim 23, wherein the current pulse has a duration of between 1 and 200 ms.

* * * * *